UNITED STATES PATENT OFFICE.

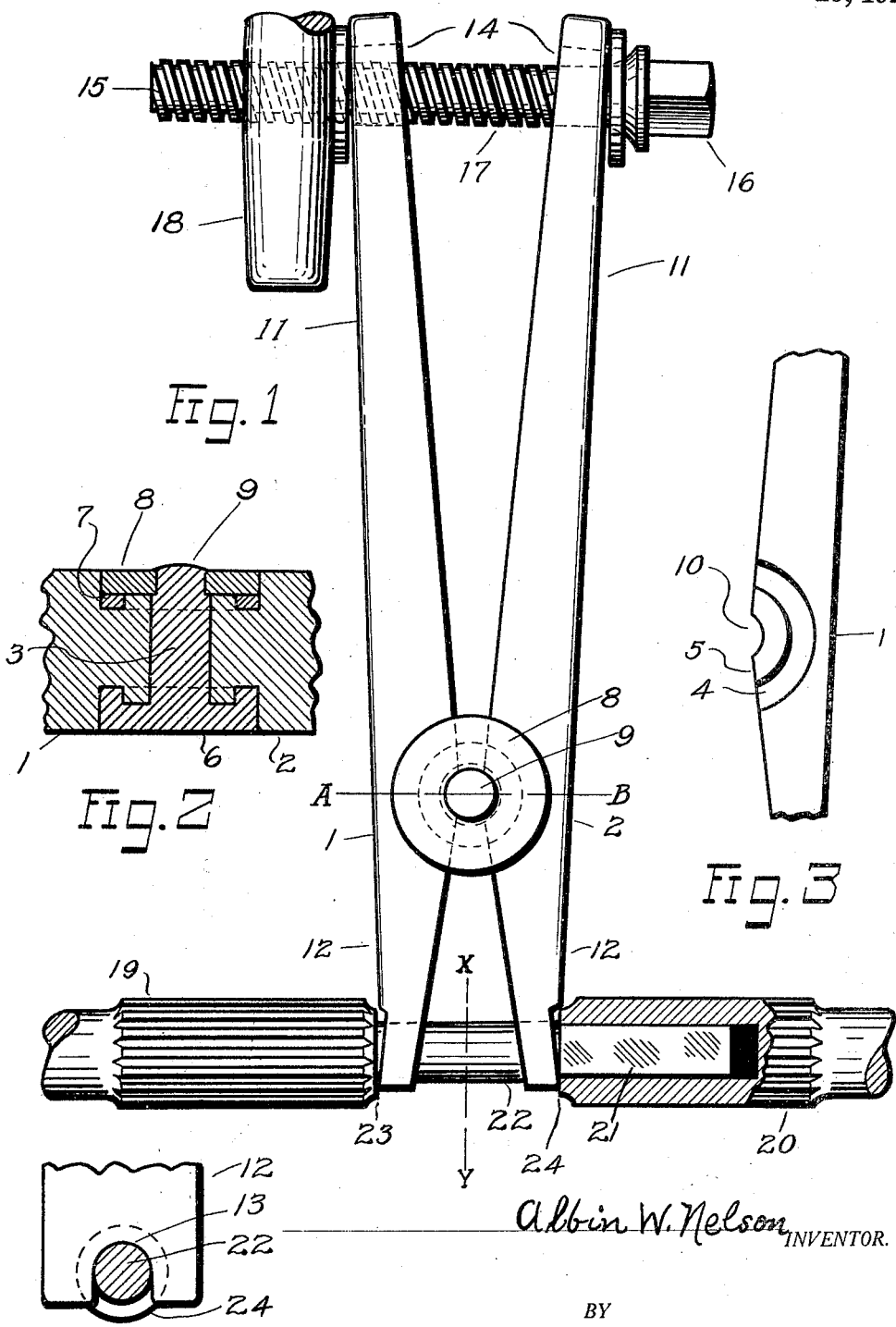

ALBIN W. NELSON, OF WHITINSVILLE, MASSACHUSETTS, ASSIGNOR TO WHITIN MACHINE WORKS, OF WHITINSVILLE, MASSACHUSETTS, A CORPORATION OF MASSACHUSETTS.

ROLL-SPREADER.

1,398,269.　　　　Specification of Letters Patent.　　Patented Nov. 29, 1921.

Application filed November 19, 1920. Serial No. 425,201.

*To all whom it may concern:*

Be it known that I, ALBIN W. NELSON, a citizen of the United States, and resident of Whitinsville, in the county of Worcester and Commonwealth of Massachusetts, have invented certain new and useful Improvements in Roll-Spreaders, of which the following is a specification.

This invention has for its object the production of an instrument for facilitating the separation of drawing roll sections.

In some classes of machines, in particular textile machines for drawing, spinning and twisting yarns the drawing rolls are made up of short sections tightly joined together by male and female joints. For the purpose of making repairs on one or more sections it becomes necessary to disconnect them, which with the present means for so doing often proves a very difficult undertaking owing to the tightness of the fit of the joining members. My invention overcomes this difficulty by providing a manually operated instrument of a simple and durable construction by means of which the sections are spread apart with but little exertion on the part of the operator.

The various novel features of my invention will be fully described in the subjoined specification and particularly pointed out in my claim.

On the accompanying drawings:—Figure 1 is an elevation of my invention showing it in operative relation to a drawing roll preparatory to the act of disconnecting the roll sections. Fig. 2 is a sectional elevation on line AB of the joint of my disconnecting instrument. Fig. 3 is a plan view of one of the levers showing its construction at the joint. Fig. 4 is a sectional view on line XY of a drawing roll bearing showing the jaw of my improved instrument embracing the bearing preparatory to separating the sections.

In the drawings, wherein for the purpose of illustration is shown a preferred form of my invention comprising a pair of levers 1 and 2 joined together at their common fulcrum 3 by a joint consisting of annular grooves 4 and annular raised portions 5 formed in both sides of each lever. This construction on one side of the instrument loosely coacts with grooves and raised portions of the disk 6 thus hinging the two levers together in connection with the ring 7 loosely fitted in groove 4 on the opposite side of the instrument. The members of the joint are securely locked together by the washer 8 fastened to the end 9 of the fulcrum stud 3. A circular bearing surface 10 formed in each lever abuts against the fulcrum stud 3. Each lever consists of handle-portions 11 and jaw-portions 12. The end of each jaw forms a yoke 13 for embracing the roll bearing. Slots 14 are provided in the ends of the handle-portions of the levers through which loosely passes a bolt 15 having a head 16 for the reception of a wrench and a threaded part 17 which coacts with the nut 18 serving as a means for exerting force on the levers to spread the roll sections.

Should it be desired to separate the sections 19 and 20 of a drawing roll tightly joined together by a male and female joint 21 as shown in sectional view of roll in Fig. 1, the operator places the jaws over the roll bearing 22, the sides of the jaws abutting against the shoulders 23 and 24 of the roll sections, then the operator by means of the nut 18 and screw 17, forces the two handle-portions of the instrument toward each other and through action on the fulcrum 3 the jaws spread apart thus separating the roll sections. Owing to the loose fits of the joint members all the strains of the operation are borne by the fulcrum stud 3 through the bearings 10 of the levers.

It is to be understood that the form of my invention herewith shown and described is to be taken as a preferred form of the same, and that various changes in shape, size and arrangement of parts may be resorted to without departing from the spirit of the invention or the scope of the subjoined claim.

Having thus described my invention, what I claim is:—

An instrument of the character described comprising a pair of levers, circular grooves formed on both sides of each lever concentric with the fulcrum center, a disk formed to loosely fit in the groove on one side of the pair of levers, a ring loosely fitting the groove on the opposite side of the pair of levers, a retaining washer for said ring and means connecting the washer and disk comprising a centrally located stud the portion between the washer and disk serving as a fulcrum for the levers.

In testimony whereof I have signed this specification.

ALBIN W. NELSON.